United States Patent
Liu et al.

(10) Patent No.: US 9,478,236 B1
(45) Date of Patent: Oct. 25, 2016

(54) PERPENDICULAR MAGNETIC RECORDING WRITE HEAD

(71) Applicants: Feng Liu, San Ramon, CA (US); Jinqiu Zhang, Irvine, CA (US); Zhigang Bai, Milpitas, CA (US); Yugang Wang, Milpitas, CA (US)

(72) Inventors: Feng Liu, San Ramon, CA (US); Jinqiu Zhang, Irvine, CA (US); Zhigang Bai, Milpitas, CA (US); Yugang Wang, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/631,808

(22) Filed: Sep. 28, 2012

(51) Int. Cl.
   *G11B 5/147* (2006.01)

(52) U.S. Cl.
   CPC ..................................... *G11B 5/147* (2013.01)

(58) Field of Classification Search
   USPC ............ 360/125.02, 125.03, 125.06, 125.12, 360/125.13, 125.14, 125.15
   See application file for complete search history.

(56) References Cited

U.S. PATENT DOCUMENTS

| | | | |
|---|---|---|---|
| 5,801,910 A | 9/1998 | Mallary | |
| 6,172,848 B1 | 1/2001 | Santini | |
| 6,504,675 B1 | 1/2003 | Shukh et al. | |
| 6,710,973 B2 * | 3/2004 | Okada et al. | 360/125.13 |
| 6,722,018 B2 | 4/2004 | Santini | |
| 6,731,460 B2 | 5/2004 | Sasaki | |
| 6,738,223 B2 | 5/2004 | Sato et al. | |
| 6,762,911 B2 | 7/2004 | Sasaki et al. | |
| 6,813,116 B2 | 11/2004 | Nakamura et al. | |
| 6,829,819 B1 | 12/2004 | Crue, Jr. et al. | |
| 6,857,181 B2 | 2/2005 | Lo et al. | |
| 6,870,712 B2 | 3/2005 | Chen et al. | |
| 6,891,697 B2 | 5/2005 | Nakamura et al. | |
| 6,903,900 B2 | 6/2005 | Sato et al. | |
| 6,912,106 B1 | 6/2005 | Chen et al. | |
| 6,944,938 B1 | 9/2005 | Crue, Jr. et al. | |
| 6,947,255 B2 | 9/2005 | Hsiao et al. | |
| 6,950,277 B1 | 9/2005 | Nguy et al. | |
| 6,952,325 B2 * | 10/2005 | Sato et al. | 360/125.08 |
| 6,975,486 B2 | 12/2005 | Chen et al. | |
| 6,995,949 B2 * | 2/2006 | Nakamura et al. | 360/125.13 |
| 7,006,326 B2 | 2/2006 | Okada et al. | |
| 7,070,698 B2 | 7/2006 | Le | |
| 7,100,266 B2 | 9/2006 | Plumer et al. | |
| 7,133,252 B2 | 11/2006 | Takano et al. | |
| 7,133,253 B1 | 11/2006 | Seagle et al. | |
| 7,139,153 B2 | 11/2006 | Hsiao et al. | |
| 7,159,302 B2 | 1/2007 | Feldbaum et al. | |
| 7,185,415 B2 | 3/2007 | Khera et al. | |
| 7,206,166 B2 * | 4/2007 | Notsuke et al. | 360/122 |
| 7,212,379 B2 | 5/2007 | Hsu et al. | |
| 7,245,454 B2 | 7/2007 | Aoki et al. | |
| 7,251,878 B2 | 8/2007 | Le et al. | |
| 7,253,992 B2 | 8/2007 | Chen et al. | |
| 7,296,338 B2 | 11/2007 | Le et al. | |
| 7,324,304 B1 | 1/2008 | Benakli et al. | |
| 7,369,359 B2 | 5/2008 | Fujita et al. | |
| 7,392,577 B2 | 7/2008 | Yazawa et al. | |
| 7,430,095 B2 | 9/2008 | Benakli et al. | |

(Continued)

*Primary Examiner* — Allen T Cao
(74) *Attorney, Agent, or Firm* — Arent Fox LLP

(57) ABSTRACT

A main pole of a perpendicular magnetic recording write head is disclosed with a non-rectangular shape at the air bearing surface and a rectangular shape behind the air bearing surface. The main pole transitions from the non-rectangular shape to a rectangular shape at a distance of 10 nm to 100 nm behind the air bearing surface. The main pole includes leading and trailing beveled surfaces that extend from the non-rectangular shape of the pole at the air bearing surface toward the rectangular shape transition.

20 Claims, 3 Drawing Sheets

(56) References Cited

U.S. PATENT DOCUMENTS

| | | | |
|---|---|---|---|
| 7,441,325 B2 | 10/2008 | Gao et al. | |
| 7,464,457 B2 | 12/2008 | Le et al. | |
| 7,469,467 B2 | 12/2008 | Gao et al. | |
| 7,508,626 B2* | 3/2009 | Ichihara et al. | 360/125.06 |
| 7,535,675 B2* | 5/2009 | Kimura et al. | 360/125.09 |
| 7,558,019 B2 | 7/2009 | Le et al. | |
| 7,580,222 B2* | 8/2009 | Sasaki et al. | 360/125.06 |
| 7,639,451 B2* | 12/2009 | Yatsu et al. | 360/125.09 |
| 7,639,452 B2 | 12/2009 | Mochizuki et al. | |
| 7,643,246 B2 | 1/2010 | Yazawa et al. | |
| 7,663,839 B2 | 2/2010 | Sasaki et al. | |
| 7,672,079 B2 | 3/2010 | Li et al. | |
| 7,726,009 B1 | 6/2010 | Liu et al. | |
| 7,748,104 B2 | 7/2010 | Bonhote et al. | |
| 7,796,360 B2 | 9/2010 | Im et al. | |
| 7,796,361 B2* | 9/2010 | Sasaki et al. | 360/125.13 |
| 7,841,068 B2 | 11/2010 | Chen et al. | |
| 7,859,791 B2* | 12/2010 | Toma et al. | 360/125.07 |
| 7,916,425 B2 | 3/2011 | Sasaki et al. | |
| 7,921,544 B2* | 4/2011 | Sasaki et al. | 29/603.16 |
| 7,924,528 B2 | 4/2011 | Sasaki et al. | |
| 8,027,125 B2 | 9/2011 | Lee et al. | |
| 8,116,033 B2 | 2/2012 | Kameda et al. | |
| 8,125,732 B2 | 2/2012 | Bai et al. | |
| 8,141,235 B1 | 3/2012 | Zhang | |
| 8,149,536 B1 | 4/2012 | Yang et al. | |
| 8,169,741 B2* | 5/2012 | Taguchi et al. | 360/125.3 |
| 8,184,399 B2 | 5/2012 | Wu et al. | |
| 8,233,233 B1 | 7/2012 | Shen et al. | |
| 8,233,234 B2 | 7/2012 | Hsiao et al. | |
| 8,233,235 B2 | 7/2012 | Chen et al. | |
| 8,248,728 B2 | 8/2012 | Yamaguchi et al. | |
| 8,254,060 B1* | 8/2012 | Shi | G11B 5/3163 360/125.08 |
| 8,264,792 B2* | 9/2012 | Bai et al. | 360/125.15 |
| 8,264,916 B1* | 9/2012 | Aoyama | G11B 5/1278 360/125.08 |
| 8,270,109 B2* | 9/2012 | Ohtsu | 360/125.03 |
| 8,289,649 B2 | 10/2012 | Sasaki et al. | |
| 8,300,357 B1* | 10/2012 | Sasaki et al. | 360/123.06 |
| 8,305,711 B2 | 11/2012 | Li et al. | |
| 8,320,076 B1 | 11/2012 | Shen et al. | |
| 8,347,488 B2 | 1/2013 | Hong et al. | |
| 8,400,731 B1 | 3/2013 | Li et al. | |
| 8,416,528 B1* | 4/2013 | Sasaki et al. | 360/125.02 |
| 8,470,186 B2* | 6/2013 | Chen et al. | 216/22 |
| 8,493,687 B2* | 7/2013 | Sasaki et al. | 360/125.17 |
| 8,498,080 B2* | 7/2013 | Sasaki et al. | 360/125.31 |
| 8,520,337 B1* | 8/2013 | Liu et al. | 360/125.13 |
| 8,619,390 B2* | 12/2013 | Cazacu et al. | 360/125.07 |
| 8,705,205 B1 | 4/2014 | Li et al. | |
| 8,724,259 B1* | 5/2014 | Liu et al. | 360/125.15 |
| 8,749,919 B2* | 6/2014 | Sasaki et al. | 360/125.13 |
| 8,767,347 B1* | 7/2014 | Sasaki et al. | 360/125.13 |
| 8,797,686 B1* | 8/2014 | Bai et al. | 360/125.15 |
| 8,804,282 B1* | 8/2014 | Sugiyama et al. | 360/125.12 |
| 8,804,283 B2* | 8/2014 | Meloche et al. | 360/125.13 |
| 2003/0076630 A1 | 4/2003 | Sato et al. | |
| 2004/0061988 A1 | 4/2004 | Matono et al. | |
| 2004/0184191 A1 | 9/2004 | Ichihara et al. | |
| 2005/0117251 A1 | 6/2005 | Matono et al. | |
| 2005/0162778 A1* | 7/2005 | Kimura et al. | 360/126 |
| 2006/0002019 A1* | 1/2006 | Guthrie | G11B 5/1871 360/125.3 |
| 2006/0028762 A1* | 2/2006 | Gao | G11B 5/1871 360/125.13 |
| 2006/0044677 A1* | 3/2006 | Li | G11B 5/1278 360/122 |
| 2006/0158779 A1* | 7/2006 | Ota et al. | 360/126 |
| 2006/0174474 A1 | 8/2006 | Le | |
| 2006/0225268 A1 | 10/2006 | Le et al. | |
| 2006/0288565 A1 | 12/2006 | Le et al. | |
| 2007/0035878 A1* | 2/2007 | Guthrie | G11B 5/315 360/125.03 |
| 2007/0211380 A1 | 9/2007 | Akimoto et al. | |
| 2007/0236834 A1 | 10/2007 | Toma et al. | |
| 2007/0247746 A1 | 10/2007 | Kim et al. | |
| 2007/0258167 A1 | 11/2007 | Allen et al. | |
| 2007/0263324 A1 | 11/2007 | Allen et al. | |
| 2007/0283557 A1 | 12/2007 | Chen et al. | |
| 2008/0002309 A1 | 1/2008 | Hsu et al. | |
| 2008/0151437 A1 | 6/2008 | Chen et al. | |
| 2009/0279206 A1 | 11/2009 | Yang et al. | |
| 2009/0290257 A1* | 11/2009 | Kimura | G11B 5/3116 360/125.13 |
| 2010/0061199 A1* | 3/2010 | Hirara | G11B 5/314 369/13.24 |
| 2010/0146773 A1 | 6/2010 | Li et al. | |
| 2010/0165517 A1* | 7/2010 | Araki et al. | 360/319 |
| 2010/0277832 A1 | 11/2010 | Bai et al. | |
| 2011/0051293 A1* | 3/2011 | Bai | G11B 5/1278 360/313 |
| 2011/0222188 A1 | 9/2011 | Etoh et al. | |
| 2011/0249359 A1* | 10/2011 | Mochizuki | G11B 5/1278 360/75 |
| 2012/0268845 A1 | 10/2012 | Sahoo et al. | |
| 2012/0320474 A1* | 12/2012 | Soeno | G11B 5/314 360/319 |
| 2013/0242432 A1* | 9/2013 | Meloche | G11B 5/17 360/123.05 |

\* cited by examiner

PERPENDICULAR MAGNETIC RECORDING WRITE HEAD

BACKGROUND

The present disclosure relates generally to perpendicular magnetic recording (PMR) systems for hard disk drives, and more particularly, to PMR write heads.

Hard disk drives are used to store and retrieve digital information for computers and other devices. A typical hard disk drive includes a high speed rotating disk having a magnetic material on its surface. Digital information is written to and read from the disk as it rotates past a magnetic head over an air bearing interface. The magnetic head is used to detect and modify the magnetic polarization of the disk's surface immediately below it. An actuator arm moves the magnetic head on an arc across the rotating disk, thereby allowing the magnetic head to access the entire disk.

The disk includes multiple concentric tracks that cover the disk's surface. The magnetic head writes data to the disk by magnetizing segments along the circular tracks of the rotating disk. Each segment represents one bit of information. The storage capacity of a hard disk drive is a function of how large a segment must be to represent one bit of information. The capacity is often measured in terms of areal density. Areal density is equal to the bits-per-inch along the track times the tracks-per-inch radially on the disk.

In older hard disk drive designs, the bits were oriented circumferentially along the track and parallel to the disk. Today, in most hard disk drives, the bits are orientated perpendicular to the disk. These systems, known as PMR systems, reduce the size of the segment required to represent one bit of information through the perpendicular orientation of the magnetization, thereby increasing the areal density.

The magnetic head for a PMR system is designed to generate a perpendicular magnetic field. This may be achieved by embedding a soft magnetic under-layer into the disk, below the magnetic surface. In this configuration, the magnetic flux, which results from the magnetic field produced by the magnetic head, is collected by the soft magnetic under-layer and returned to the magnetic head to complete the magnetic circuit. The result is a magnetic charge with a perpendicular orientation in the surface of the disk.

As consumer demand for improved areal density increases for PMR systems, it may be desirable to implement new PMR head designs with smaller write pole tip geometry at air bearing surface (ABS) while maintaining sufficient magnetic fields.

SUMMARY

Several aspects of the present invention will be described more fully hereinafter with reference to various embodiments of apparatuses and methods related to PMR technology.

An aspect of a perpendicular magnetic recording write head for a hard disk drive includes a main pole that transitions from a non-rectangular shape at an air bearing surface to a rectangular shape at a distance between 10 nm and 100 nm from the air bearing surface.

Another aspect of perpendicular magnetic recording write head for a hard disk drive includes a main pole that transitions from a non-rectangular shape at an air bearing surface to a rectangular shape away from the air bearing surface, wherein the main pole further includes leading and trailing beveled surfaces extending from the air bearing surface toward the rectangular shape transition of the main pole.

An aspect of a magnetic hard disk drive includes a rotatable perpendicular magnetic recording disk, and a perpendicular magnetic recording write head arranged within the hard disk drive to have an air bearing interface with the perpendicular magnetic recording disk when the perpendicular magnetic recording disk is rotated, wherein the perpendicular magnetic recording write head comprises a main pole that transitions from a non-rectangular shape at an air bearing surface to a rectangular shape at a distance between 10 nm and 100 nm from the air bearing surface.

It will be understood that other aspects of the present invention will become readily apparent to those skilled in the art from the following detailed description, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, in the accompanying drawings, wherein.

DETAILED DESCRIPTION

Figure 1:
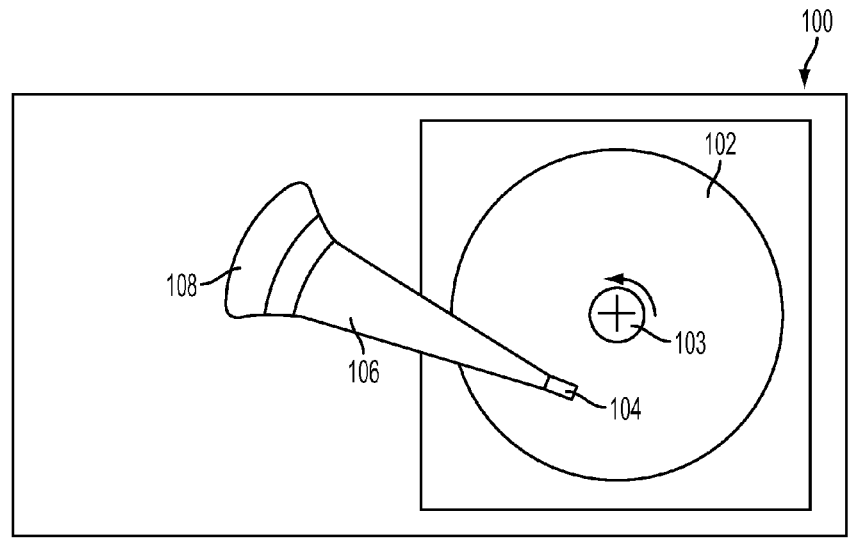
FIG. 1 is a conceptual view of an exemplary PMR hard drive disk.

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference to certain shapes and geometries, such as, by way of example, the shape of a PMR write head pole. Any reference to a component having a particular shape or geometry, however, should not be construed as limited to the precise shape illustrated or described, but shall include deviations that result, for example, from manufacturing techniques and/or tolerances. By way of example, a component, or any part of a component, may be illustrated or described as rectangular, but in practice may have rounded or curved features due to manufacturing techniques and/or tolerances. Accordingly, the components illustrated in the drawings are schematic in nature and their shapes are not intended to illustrate the precise shape of the component, and therefore, not intended to limit the scope of the present invention.

When describing various portions of components, such as, by way of example, a PMR write head pole, relative terms (e.g., "behind," "bottom" and "top") may be used to illustrate the relationship of one portion of the component to another portion of the component in the drawings. It will be understood that relative terms are intended to encompass different orientations of an apparatus in addition to the orientation shown in the drawings. By way of example, if an apparatus in the drawings is turned over, portions of a component described as being on the "bottom" would then be oriented on the "top" and portions described as being on the "top" would then be oriented on the "bottom." Similarly, if an apparatus in the drawings is rotated 90° forward (i.e., out from the page), portions of a component described as being "behind" would then be oriented on the "top." Thus, relative terms used to describe the orientation of components are provided solely for illustrative purposes and are not intended to limit the invention in any way.

Reference to various ranges may be used to describe certain aspects of the present invention. By way of example, a range may be used to describe a transition in the shape of a PMR write head pole in relation to the ABS. The range may be recited as a transition occurring between a minimum and maximum distance behind the ABS. The use of a range to describe or claim any component is intended to include both the minimum and maximum values recited, as well as all the values between the two. By way of example, a recitation to a component that transitions from one shape to another at a distance between x and y from the ABS, would include x and y as well as all the values between x and y.

In the following detailed description, various aspects of the present invention will be presented in the context of PMR hard disk drives. While these inventive aspects may be well suited for this application, those skilled in the art will realize that such aspects may be extended to other magnetic storage devices. Accordingly, any reference to a PMR hard drive disk is intended only to illustrate the various aspects of the present invention, with the understanding that such aspects may have a wide range of applications.

FIG. 1 is a conceptual view of an exemplary PMR hard drive disk. The PMR hard drive disk 100 is shown with a rotatable magnetic disk 102. The magnetic disk 102 may be rotated on a spindle 103 by a disk drive motor (not shown) located under the magnetic disk 102. A PMR head 104 may be used to write to and read from the magnetic disk 102. As the motor rotates the magnetic disk 102, an air bearing may be formed under the PMR head 104 causing it to lift slightly off the surface of the magnetic disk 102, or as it is termed in the art, to "fly" above the magnetic disk 102. The PMR head 104 may be used to read and write information by detecting and modifying the magnetic polarization of the material on the disk's surface. An actuator or access arm 106 may be used to move the PMR head 104 on an arc across the rotating magnetic disk 102, thereby allowing the PMR head 104 to access the entire surface of the magnetic disk 102. The arm 106 may be moved using a voice coil actuator 108 or by some other suitable means.

Figure 2:
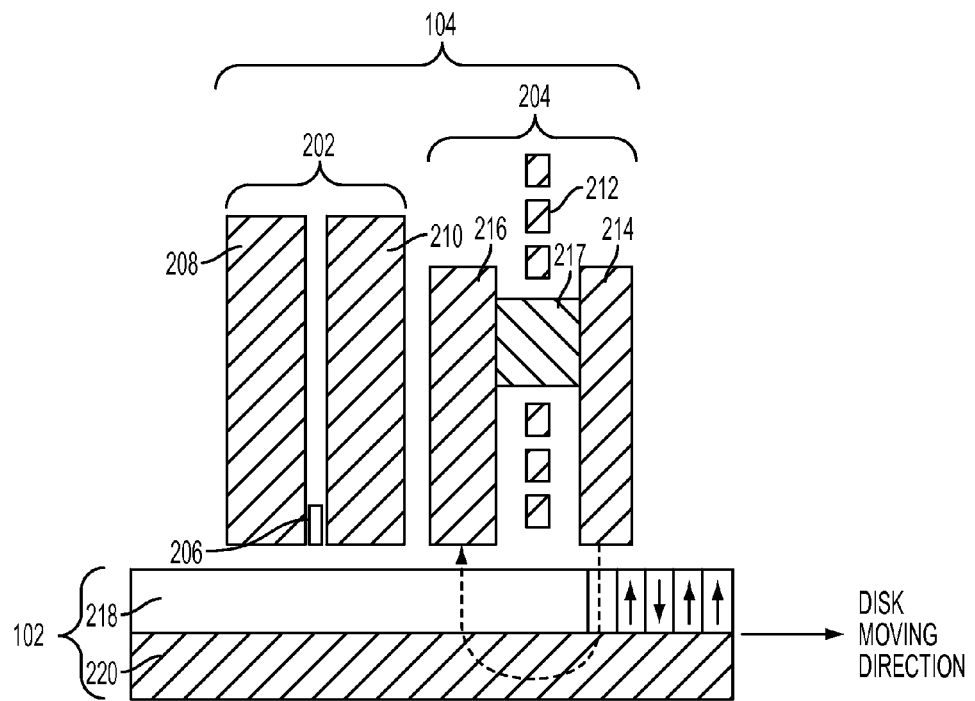
FIG. 2 is a cross-section view of an exemplary PMR head and magnetic disk.

FIG. 2 is a cross-section view of an exemplary PMR head and magnetic disk. The PMR head 104 is shown with a PMR read head 202 and a PRM write head 204. The PMR read head 202 includes a read element 206 positioned between two shields 208 and 210. The PMR write head 204 includes a main pole 214 coupled to an auxiliary pole 216 by a yoke 217. A thin film coil 212 is positioned between the main and auxiliary poles.

The magnetic disk 102 is shown with a hard magnetic recording layer 218 and a soft magnetic under-layer 220, which together provide a flux path between the main and auxiliary poles. The magnetic disk 102 may have other layers that have been omitted from this description for the purpose of clarity.

In this example, the magnetic disk 102 is moved past the PMR head 104 along a circular track of the magnetic disk 102. When current is applied to the thin film coil 212, a perpendicular magnetic field is created between the tip of the main pole 214 and the soft magnetic under-layer 220. The magnetic flux is collected by the soft magnetic under-layer 220 and returned to the auxiliary pole 216 to complete the magnetic circuit. The result is a magnetic charge with a perpendicular orientation on the segment of the magnetic recording layer 218 of the disk 102 immediately below the main pole 214 of the write head 204. The recording magnetic field distribution depends on the shape of the main pole 214.

The shape of the PMR write head 204 may take on various forms depending upon the particular application and the overall design constraints. By way of example, the main pole 214 of the PMR write head 204 may have a non-rectangular shape at the ABS and a rectangular shape behind the ABS. The non-rectangular shape of the main pole 214 may be trapezoidal, triangular, or any other suitable non-rectangular shape that enables the PMR write pole 204 to produce a sufficient magnetic field. In one exemplary embodiment of a PMR write head 204, the main pole 214 transitions from the non-rectangular shape to a rectangular shape at a distance of 10 nm to 100 nm behind the ABS. In another exemplary embodiment of a PMR write head 204, the main pole 214 includes leading and trailing beveled surfaces that extend from the non-rectangular shape of the pole 214 at the ABS toward the rectangular shape transition.

Figure 3:
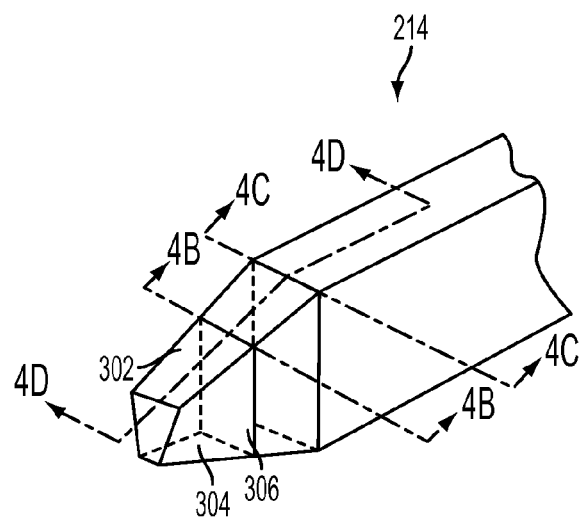
FIG. 3 is a perspective view of an exemplary embodiment of a main pole for a PMR write head.
Figure 4A:
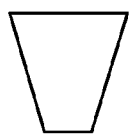
FIGS. 4A-4D are cross-sectional views of the exemplary embodiment of the main pole shown in FIG. 3.
Figure 4B:
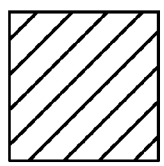
Figure 4C:
Figure 4D:
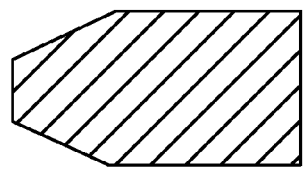

FIG. 3 is a perspective view of an exemplary embodiment of a main pole for a PMR write head. FIGS. 4A-4C are cross-sectional views of the exemplary embodiment of the main pole shown in FIG. 3 along various planes which are parallel to the ABS. Specifically, FIG. 4A is a cross-sectional view of the main pole of FIG. 3 at the ABS, FIG. 4B is a cross-sectional view of the main pole taken along line B-B of FIG. 3, and FIG. 4C is a cross-sectional view of the main pole taken along line C-C of FIG. 3. FIG. 4D is a cross-sectional view of the main pole taken along line D-D of FIG. 3.

Referring to FIGS. 3 and 4A-4D, the main pole 214 is shown with a top surface 302 and a bottom surface 304. Two angled side walls 306 extend between the top and bottom surfaces. The top and bottom surfaces constitute the trailing and leading surfaces of the main pole 214, respectively, with reference to the rotation of the magnetic disk (not shown). In this example, the main pole 214 has a trapezoidal shape at the ABS as shown in FIG. 4A. At the ABS, the edge along the top surface 302 has a greater width than the edge along the bottom surface 304. The side wall angle (SWA) at the ABS may be any suitable angle depending on the drive integration requirements. In one exemplary embodiment, the SWA of the main pole 214 at the ABS is approximately 12° or more.

As shown in FIG. 4B, the main pole 214 transitions from a trapezoidal shape at the ABS to a rectangular shape at a distance t (nm) behind the ABS. For the rectangular pole shape, the SWA is approximately 0 o and the widths of the top and bottom surfaces are approximately equal. In one exemplary embodiment, the distance t (nm) is between 10 nm to 100 nm, preferably between 20 nm to 60 nm. As shown in FIGS. 4C and 4D, the cross-sectional area of the rectangular pole shape may increase as the distance from the ABS increases. As shown in FIG. 4D, at some distance behind the ABS, the main pole reaches a maximum cross-sectional area which remains relatively fixed back to the yolk (not shown) of the PMR write head (not shown). The transition between the trapezoidal pole shape at the ABS and the rectangular pole shape behind the ABS may be substantially linear. "Substantially linear" means that the transition may deviate from a strict linear transition in accordance with manufacturing processes and/or tolerances. By way of example, the transition may exhibit rounding effects from a photolithography patterning process. Alternatively, the transition may be nonlinear. Those skilled in the art will be readily able to determine the appropriate pole transition for any particular application based on the teachings presented throughout this disclosure.

As shown in FIG. 4C, the top and bottom surfaces of the main pole 214 may be beveled. The beveled surfaces may extend from the trapezoidal pole shape at the ABS, past the rectangular transition, to a distance behind the ABS where the rectangular pole shape reaches its maximum cross-sectional area. The angle of the beveled surfaces and the distance the beveled surfaces extend behind the ABS may vary depending on the design of the main pole 214. In one exemplary embodiment, the angle of the trailing surface is between 15° and 35°, and the angle of the leading surface is between 15° and 50°, both with respect to an axis normal to the ABS. In the same, or another, exemplary embodiment, the distance behind the ABS where the rectangular pole shape reaches its maximum cross-sectional area is between 40 nm and 200 nm for the trailing surface, and between 60 nm and 150 nm for the leading surface. Those skilled in the art will be able to readily determine the optimal bevel angle and distance behind the ABS for any particular application based on the teachings presented throughout this disclosure.

Figure 5:
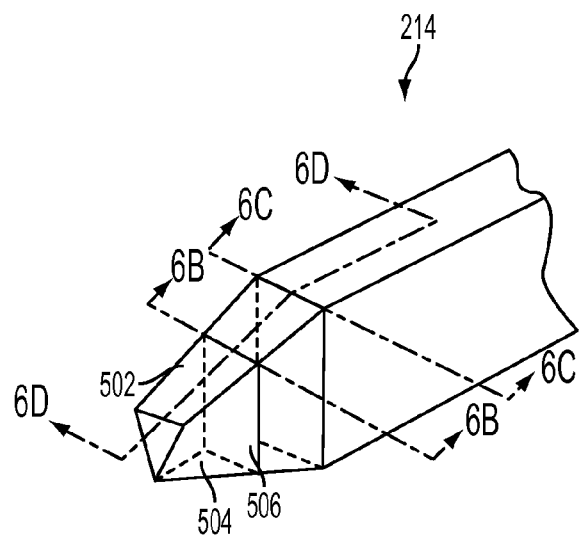
FIG. 5 is a perspective view of another exemplary embodiment of a main pole for a PMR write head.
Figure 6A:
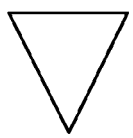
FIGS. 6A-6D are cross-sectional views of the exemplary embodiment of the main pole shown in FIG. 5.
Figure 6B:
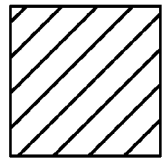
Figure 6C:
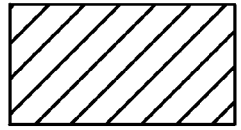
Figure 6D:
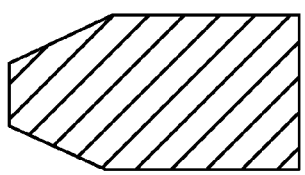

FIG. 5 is a perspective view of another exemplary embodiment of a main pole for a PMR write head. FIGS. 6A-6C are cross-sectional views of the exemplary embodiment of the main pole shown in FIG. 5 along various planes which are parallel to the ABS. Specifically, FIG. 6A is a cross-sectional surface of the main pole of FIG. 5 at the ABS, FIG. 6B is a cross-sectional view of the main pole taken along line B-B of FIG. 5, and FIG. 6C is a cross-sectional view of the main pole taken along line C-C of FIG. 5. FIG. 6D is a cross-sectional view of the main pole taken along line D-D of FIG. 5.

Referring to FIGS. 5 and 6A-6D, the main pole 214 is similar to the main pole described in connection with FIG. 3 above, except that the shape of the main pole 214 at the ABS is triangular. In this example, the main pole includes top and bottom surfaces 502 and 504, respectively, that constitute the trailing and leading surfaces of the main pole 214 with respect to the rotation of the disk (not shown). Two angled side walls 506 extend from opposite ends of the top surface 502 and to form a vertex 503 at the bottom surface 504. The side wall angle (SWA) at the ABS may be any suitable angle depending on the drive integration requirements. In one exemplary embodiment, the SWA of the main pole 214 at the ABS is approximately 12° or more.

As shown in FIG. 6B, the main pole 214 transitions from a triangular shape at the ABS to a rectangular shape at a distance t (nm) behind the ABS. The rectangular pole shape may be the same as described above in connection with FIG. 3. The SWA is approximately 0 o and the widths of the top and bottom surfaces are approximately equal. In one exemplary embodiment, the distance t (nm) is between 10 nm to 100 nm, preferably between 20 nm to 60 nm. As shown in FIGS. 6C and 6D, the cross sectional area of the rectangular pole shape may increase as the distance from the ABS increases. As shown in FIG. 6D, at some distance behind the ABS, the main pole reaches a maximum cross-sectional area which remains relatively fixed back to the yolk (not shown) of the PMR write head (not shown). The transition between the triangular pole shape at the ABS and the rectangular pole shape behind the ABS may be substantially linear as defined above. Alternatively, the transition may be nonlinear. Those skilled in the art will be readily able to determine the appropriate pole transition for any particular application based on the teachings presented throughout this disclosure.

As shown in FIG. 6C, the top and bottom surfaces of the main pole 214 may be beveled. The beveled surfaces may extend from the triangular pole shape at the ABS, past the rectangular transition, to a distance behind the ABS where the rectangular pole shape reaches its maximum cross-sectional area. The angle of the beveled surfaces and the distance the beveled surfaces extend behind the ABS may vary depending on the design of the main pole 214. In one exemplary embodiment, the angle of the trailing surface is between 15° and 35°, and the angle of the leading surface is between 15° and 50°, both with respect to an axis normal to the ABS. In the same, or another, exemplary embodiment, the distance behind the ABS where the rectangular pole shape reaches its maximum cross-sectional area is between 40 nm and 200 nm for the trailing surface, and between 60 nm and 150 nm for the leading surface. Those skilled in the art will be able to readily determine the optimal bevel angle and distance behind the ABS for any particular application based on the teachings presented throughout this disclosure.

The various configurations of the main pole described above may exhibit improved performance over conventional PMR write heads. By way of example, a PMR write head with a main pole configuration described herein may exhibit an increase in out of plane magnetic field ($H_y$) and thus improved reverse overwrite (ReOVW) gain. The improvement in the ReOVW gain may vary with different transition points from a non-rectangular to a rectangular pole shape. The main pole configurations described herein may also exhibit increased down track magnetic field gradient which generally improves the signal-to-noise ratio (SNR). The improvements in ReOVW gain and down track magnetic field gradient may enable higher recording areal density. Comparable off track adjacent track interference (ATI) erasure field with conventional PMR write heads may also be achieved. The various configurations of main pole designs described herein may also result in increased pole tip magnetic volume, which generally improves cross track magnetic anisotropy ($H_k$) to mitigate domain lockup. In summary, the above disclosed main pole configurations may enable higher areal density.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A perpendicular magnetic recording write head for a hard disk drive, comprising:
    a main pole that transitions from having a non-rectangular shape at an air bearing surface to having a rectangular shape at a distance between 10 nm and 100 nm from the air bearing surface, and wherein the transition of the main pole from the non-rectangular shape to the rectangular shape is linear.

2. The perpendicular magnetic recording write head of claim 1 wherein the main pole transitions to the rectangular shape at a distance between 20 nm and 60 nm from the air bearing surface.

3. The perpendicular magnetic recording write head of claim 1 wherein the nonrectangular shape of the main pole at the air bearing surface comprises a trapezoidal shape.

4. The perpendicular magnetic recording write head of claim 1 wherein the nonrectangular shape of the main pole at the air bearing surface comprises a triangular shape.

5. The perpendicular magnetic recording write head of claim 1 wherein the main pole comprises leading and trailing beveled surfaces extending away from the air bearing surface towards the rectangular shape transition of the main pole.

6. The perpendicular magnetic recording write head of claim 5 wherein the trailing beveled surface extends beyond the rectangular shape transition of the main pole.

7. The perpendicular magnetic recording write head of claim 1 wherein the main pole comprises leading and trailing surfaces, and wherein the width of the trailing surface at the air bearing surface is larger than the width of the leading surface at the air bearing surface.

8. A perpendicular magnetic recording write head for a hard disk drive, comprising:
    a main pole that transitions from a non-rectangular shape at an air bearing surface to a rectangular shape away from the air bearing surface, wherein the main pole further comprises leading and trailing beveled surfaces extending from the air bearing surface toward the rectangular shape transition of the main pole, wherein the transition of the main pole from the non-rectangular shape to the rectangular shape is linear;
    wherein the trailing beveled surface extends beyond the rectangular shape transition of the main pole.

9. The perpendicular magnetic recording write head of claim 8 wherein the leading beveled surface extends beyond the rectangular shape transition of the main pole.

10. The perpendicular magnetic recording write head of claim 8 wherein the main pole transitions to the rectangular shape at a distance between 10 nm and 100 nm from the air bearing surface.

11. The perpendicular magnetic recording write head of claim 8 wherein the main pole transitions to the rectangular shape at a distance between 20 nm and 60 nm from the air bearing surface.

12. The perpendicular magnetic recording write head of claim 8 wherein the nonrectangular shape of the main pole at the air bearing surface comprises a trapezoidal shape.

13. The perpendicular magnetic recording write head of claim 8 wherein the nonrectangular shape of the main pole at the air bearing surface comprises a triangular shape.

14. The perpendicular magnetic recording write head of claim 8 wherein the main pole comprises leading and trailing surfaces, and wherein the width of the trailing surface at the air bearing surface is larger than the width of the leading surface at the air bearing surface.

15. A magnetic hard disk drive, comprising:
    a rotatable perpendicular magnetic recording disk; and
    a perpendicular magnetic recording write head arranged within the hard disk drive to have an air bearing interface with the perpendicular magnetic recording disk when the perpendicular magnetic recording disk is rotated,
    wherein the perpendicular magnetic recording write head comprises a main pole that transitions from having a non-rectangular shape at an air bearing surface to having a rectangular shape away from the air bearing surface, and wherein the transition of the main pole from the non-rectangular shape to the rectangular shape is linear,
    wherein the main pole further comprises leading and trailing beveled surfaces extending from the air bearing surface toward the rectangular shape transition of the main pole, and
    wherein the trailing beveled surface extends beyond the rectangular shape transition of the main pole.

16. The perpendicular magnetic recording write head of claim 15 wherein the main pole transitions to the rectangular shape at a distance between 20 nm and 60 nm from the air bearing surface.

17. The magnetic hard disk drive of claim 15 wherein the non-rectangular shape of the main pole at the air bearing surface comprises a trapezoidal shape.

18. The magnetic hard disk drive of claim 15 wherein the non-rectangular shape of the main pole at the air bearing surface comprises a triangular shape.

19. The magnetic hard disk drive of claim 15 wherein the width of the trailing surface at the air bearing surface is larger than the width of the leading surface at the air bearing surface.

20. The perpendicular magnetic recording write head of claim 15 wherein the main pole transitions to the rectangular shape at a distance between 10 nm and 100 nm from the air bearing surface.

* * * * *